United States Patent [19]

Primdahl

[11] Patent Number: 4,526,204
[45] Date of Patent: Jul. 2, 1985

[54] CONTROL APPARATUS FOR HYDRAULIC VALVE

[75] Inventor: Richard D. Primdahl, Gurnee, Ill.

[73] Assignee: Dresser Industries, Inc., Dallas, Tex.

[21] Appl. No.: 378,666

[22] Filed: May 17, 1982

[51] Int. Cl.³ .................. F16K 31/60; F16K 31/52
[52] U.S. Cl. ......................... 137/637; 74/471 R; 74/471 XY; 251/294
[58] Field of Search ............. 137/636, 636.2, 637, 137/637.1; 251/294; 74/471 R, 475, 471 XY, 501 R, 843

[56] References Cited

U.S. PATENT DOCUMENTS

| | | | |
|---|---|---|---|
| 2,337,166 | 12/1943 | Overbeke | 137/636 |
| 2,551,442 | 5/1951 | Kuhlman | 137/636 |
| 2,745,506 | 5/1956 | McCallum | 137/637 |
| 2,847,870 | 8/1958 | Erxleben | 74/471 R |
| 2,935,890 | 5/1960 | Hall | 137/637 |
| 3,605,561 | 9/1971 | Lado | 137/636 |
| 3,795,152 | 3/1974 | Campbell | 74/471 R |
| 3,897,805 | 8/1975 | Casey | 74/471 XY |
| 4,125,034 | 11/1978 | Wineburner | 74/471 XY |

Primary Examiner—George L. Walton
Attorney, Agent, or Firm—Barry E. Deutsch

[57] ABSTRACT

A two lever, three function control apparatus for hydraulic control valves wherein a first control lever end is connected by a first cable to a first hydraulic valve operator, a link perpendicular to the first cable interconnects the first control lever and one leg of a bellcrank rotatable about on axis parallel to the first control lever. A second leg of the bellcrank disposed at right angles to the first leg is connected to a second cable parallel to the first cable which in turn connects to a second hydraulic operator. Fore-and-aft movement of the first control lever actuate only the first cable and hydraulic valve and transverse movement of the first control lever actuates only the second cable and hydraulic valve. To physically differentiate between the two function, the second bellcrank leg is twice the length of the first leg and a detent mechanism acting on the bellcrank hub is also provided. A second control lever is connected by a third cable to a third hydraulic control valve operator.

4 Claims, 3 Drawing Figures 4,526,204

CONTROL APPARATUS FOR HYDRAULIC VALVE

BACKGROUND OF THE INVENTION

This invention is related to a manual control apparatus for mechanically operating a plurality of hydraulic control valves and, more specifically, to a control apparatus including a single control lever for operating a pair of hydraulic control valves having related functions, such as lifting and tilting a dozer blade. In its specific embodiment, the invention includes a second control lever which also controls the pitch of the dozer blade.

It is advantageous to provide a multiple function control lever to avoid having separate levers and thus conserve space and prevent operator confusion. Such levers typically perform multiple functions by operating in more than one plane. However, when such levers control hydraulic control valves, especially those relating to different functions of the same implement, such as a dozer blade or front end loader, it would be helpful to the operator to provide additional physical differentiation between the various functions beyond the direction of movement. With stacked hydraulic control valves having a common input pressure, the actuating force is normally nearly the same for each valve in most circumstances thus providing little additional physical differentiation therebetween.

SUMMARY OF THE INVENTION

Accordingly, it is a primary object of the invention to provide a control apparatus for manually operating a plurality of related hydraulic control valves wherein a single control lever operates two hydraulic control valves, independently or simultaneously.

A further object of the invention is to configure such a control apparatus so that the operator can physically differentiate which function he is activating by the force required to move the control lever as well as by the direction of movement of the control lever.

Still another object of the invention is to provide a constant engagement mechanism to engage the hub of the bellcrank mechanism and further engage a detent therein in the neutral position which provides further differentiation between the two controlled functions of the control lever.

A more specific object is to provide such a control apparatus to control a dozer blade wherein said control lever controls the lift and tilt functions of said blade and a second lever controls the pitch function of said blade.

DETAILED DESCRIPTION OF THE DRAWINGS

Other objects and advantages of the invention will become more apparent upon reading the detailed description thereof and upon reference to the drawings in which.

DETAILED DESCRIPTION OF THE PREFERRED EMBODIMENTS

Figure 1:
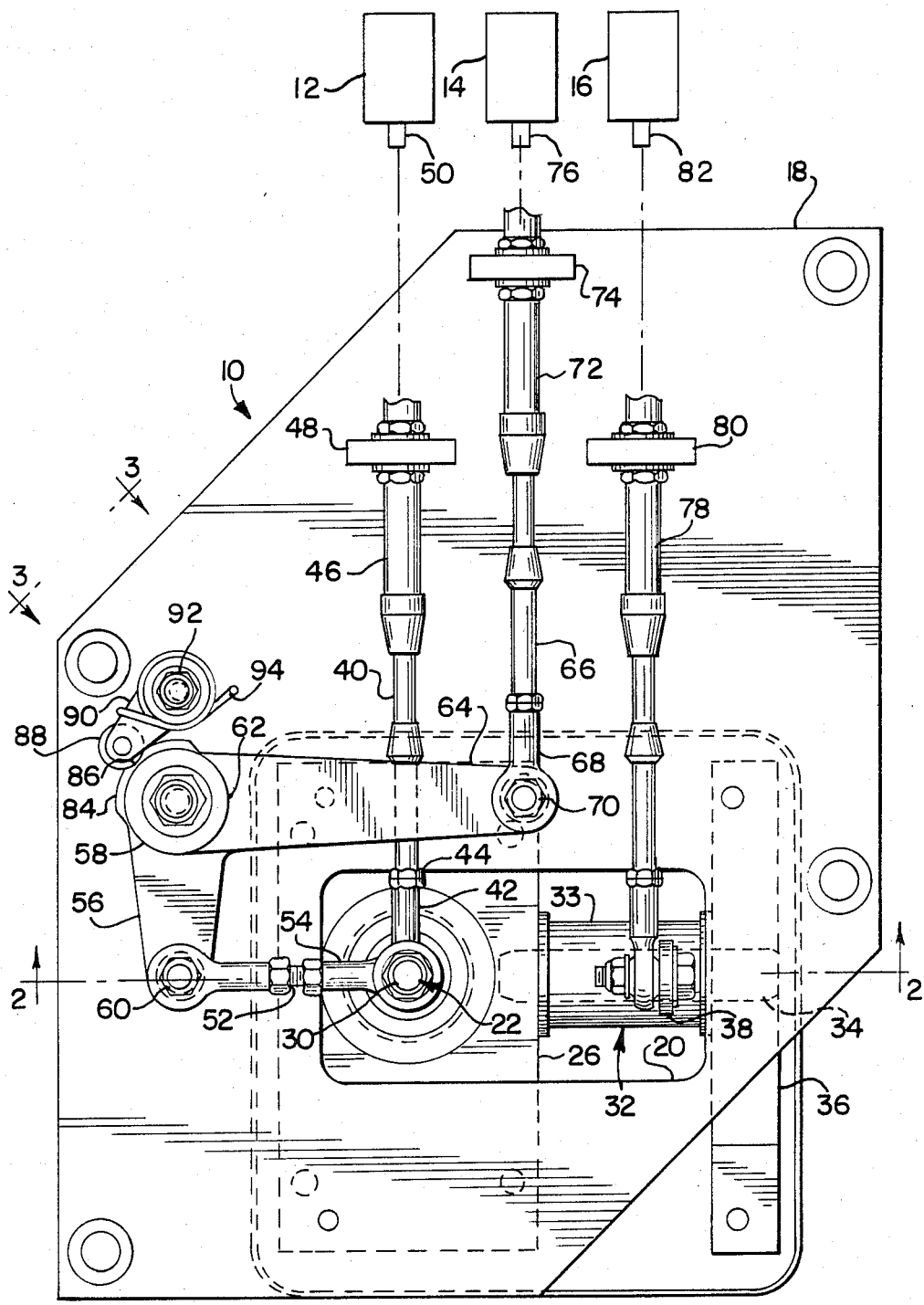
FIG. 1 is a bottom side view partly schematic of the control apparatus in accordance with the present invention.

Referring now to the drawings, there is shown a control apparatus generally designated 10 for controlling three manually operated hydraulic control valves 12, 14 and 16 which preferably are stacked in a valve bank and used to control the lift, tilt, and pitch respectively of a dozer blade. The hydraulic valves 12, 14, 16 and the circuitry by which they control the dozer blade are unimportant for the purposes of this invention but the details thereof may be found by reference to U.S. patent application Ser. No. 125,398, filed Feb. 27, 1980. It will be appreciated that the force required to manually actuate the three valves is approximately the same.

Figure 2:
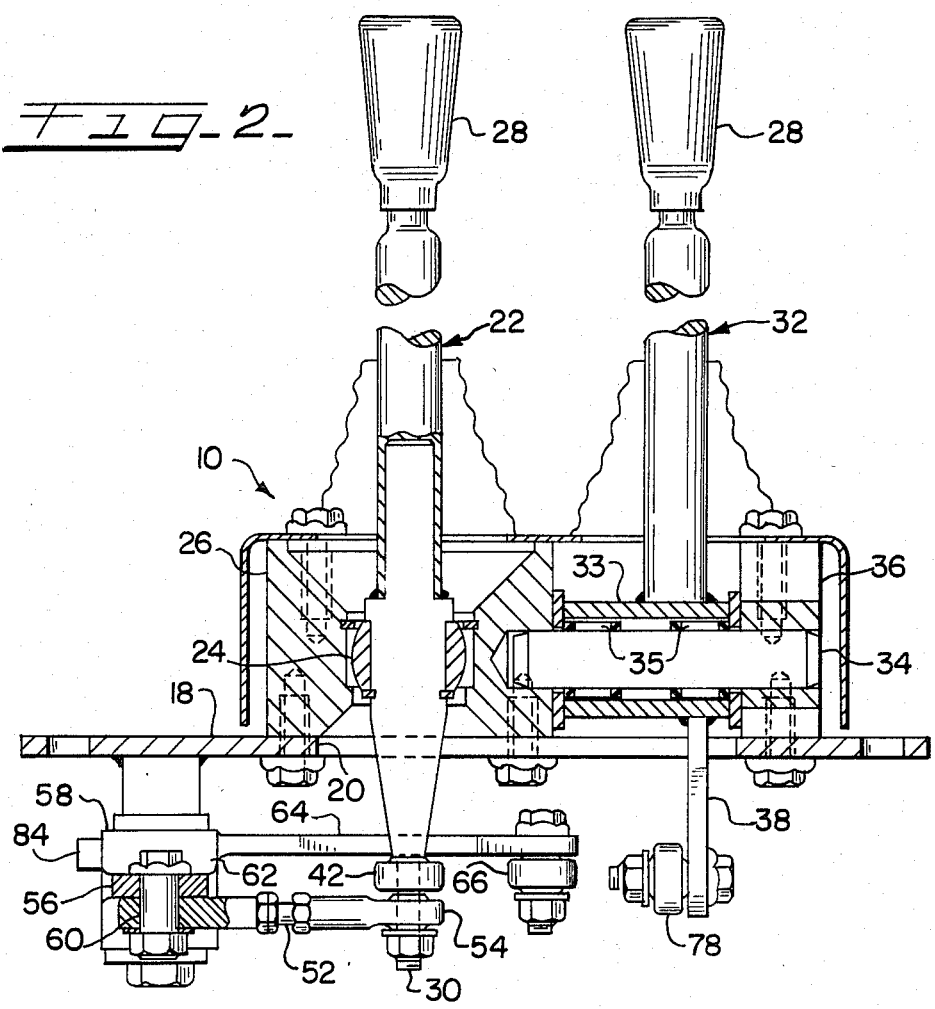
FIG. 2 is a cross section, inverted for clarity, taken along the line 2—2 of FIG. 1.
Figure 3:
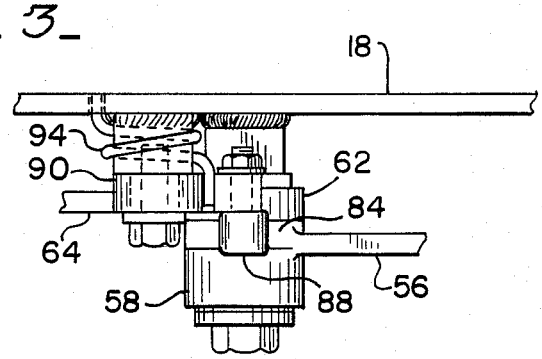
FIG. 3 is a view of the detent mechanism controlling the bellcrank taken from the line 3—3 of FIG. 1.

The control apparatus 10 comprises a base plate 18 which may be the lower side of a console in the operator's compartment of a vehicle carrying the dozer blade. As best seen in FIG. 2, base plate 18 is provided with a hole 20 through which a first control lever 22 extends in generally perpendicular fashion, the control lever 22 being mounted by a spherical ball bearing assembly 24 in a bearing support block 26 mounted to the upper side of the base plate 18. The upper portion of the control lever 22 extends upwardly to a handhold 28 and the lower portion extends from the spherical bearing 24 to a control end 30 below the base plate. It will be seen that the design of the bearing block 26 and spherical bearing 24 permit a fairly broad range of fore-and-aft and side-to-side movement of the control lever 22 and corresponding movements of the control end 30 thereof.

A second control lever 32 is pivotally mounted by a sleeve 33 and bearings 35 for fore-and-aft movement on a transverse shaft 34 partially mounted in the bearing block 26 and extending laterally thereof to a support 36 mounted to the base plate 18. The second control lever 32 also has a handhold 28 adjacent the handhold of the first lever 22 and a lower control end 38 which moves only in the fore-and-aft direction.

A first cable assembly 40 of conventional design, such as a Bowden cable, is pivotally connected to the control end 30 of the lever 22, as by an eye hook rod end 42 threaded onto the end of the cable 40 and retained as by locking nut 44. The cable 40 extends in a fore-and-aft direction into a sheath 46 mounted to a bracket 48 attached to the base plate 18 and then extends through the vehicle to the manual operator 50 of the lift valve 12. Thus, fore-and-aft movements of the handhold 28 of the first control lever 22 will create the opposite movements of the control end 30 and of the first cable assembly 40 and therefore of the manual operator 50 of the lift valve 12.

An adjustable length link 52, formed by a pair of eye hook rod ends 54 and a connector therebetween, is pivotally mounted on the control end 30 of the control lever 22 below the first cable rod end 42, both of the rod ends being retained thereon by a nut. The link 52 extends substantially perpendicularly to the first cable assembly 40 to a pivotal connection with a first leg 56 of bellcrank 58 as by pin 60. The bellcrank 58 has a hub portion 62 pivotally mounted, as by needle bearings, to the base plate 18 for rotation about a vertical axis parallel to the control lever 22. The bellcrank has a second leg 64 disposed at a right angle to the first leg 56 and of substantially longer length, preferably about twice as long, to which a second cable assembly 66 is pivotably attached as by rod end 68 and pivot pin 70, the cable 66 being received in a sheath 72 affixed to the base plate 18 as by bracket 74 so that the second cable assembly 66 is disposed parallel to the first cable assembly 40. The cable 66 extends to the manual operator 76 of the lift control valve 14.

A third cable 78 is pivotally connected to the control end 38 of the second control lever 32 and extends in parallel with the first and second cable assembly 46, 66 to a mounting bracket 80 on the base plate 18 and then to the manual operator 82 of the pitch valve 16.

The hub 62 of the bellcrank is provided with a raised concentric surface 84 in the quadrant opposite that enclosed by the legs 56 and 64. The concentric surface 84 has an indentation 86 at the central portion thereof which may be engaged by a roller follower 88 mounted for rotation to the end of a detent lever 90 which is pivotally mounted as at 92 to the bottom side of the base plate 18. The roller 88 is continuously spring biased against the concentric surface 84 of the hub 62 by helical spring 94 and may fall into the indentation 86 to prevent movement of the bellcrank 58 in the absence of external forces on the bellcrank caused by the control lever 22.

It will be appreciated that the relative geometry described above between the various parts is with both levers in the neutral position. However, the movements required to engage the control valves tend to be sufficiently small as to not substantially effect the geometry. The length of the various cables and link 52 may all be adjusted to achieve parallelism or perpendicularity, as the case may be, with the goal that when the control lever 22 is moved in the fore-and-aft direction only the lift control valve 12 will be actuated and when the control lever 22 is moved in the transverse direction, only the lift control valve 14 will be actuated. It will be appreciated that the control lever 22 may be put in a both valves 12 and 14 would be simultaneously actuated.

Thus, has been provided in accordance with the invention a control apparatus for manually operating a plurality of hydraulic control valves that fully meets the objects and advantages set forth above.

What is claimed is:

1. Control apparatus for manually operating a plurality of hydraulic control valves having manual operators comprising:

a base plate;

a control lever mounted to said base plate by spherical pivot means and projecting generally perpendicularly thereto on one side to a first end having a handhold and on the other side to a control end;

a first control cable having one end pivotally connected to said control end of said control lever and the other end operatively connected to a first hydraulic control valve operator;

an adjustable link pivotally connected to said control end of said control lever and extending in a direction substantially perpendicularly to said first control cable;

a bellcrank pivotally mounted to said base plate about an axis parallel to said control lever and having a first leg perpendicular to said link and pivotally connected thereto and having a second leg disposed perpendicularly to said first leg;

a second cable means pivotally connected to said second bellcrank leg and disposed perpendicularly thereto and extending substantially parallel to said first cable to a second hydraulic control valve operator, the lengths of said first and second cable and said link being so adjusted to maintain the relative parallelism and perpendicularity such that small movements of said control lever in a direction parallel to said first cable will actuate said first hydraulic control valve without actuating said second hydraulic control valve and small movements of said control lever in a direction parallel to said link will actuate said second hydraulic control valve without actuating said first hydraulic control valve, said control lever further having a position wherein both valves are simultaneously actuated.

2. The invention in accordance with claim 1 and said second bellcrank leg being substantially longer than said first bellcrank leg such that substantially greater force on said control lever is required to actuate said second control valve than is required to actuate said first control valve.

3. The invention in accordance with claim 1 or claim 2 and said bellcrank having a hub including a surface concentric with said axis having an indentation and a roller mounted to said base plate for movement against said bellcrank hub surface, said roller being spring-biased against said hub to engage said hub indentation and maintain the position of said bellcrank in the absence of external forces on said control lever.

4. The invention in accordance with claim 3 and a second control lever pivotally mounted to said base plate adjacent said first control lever for movement parallel to said first cable, said second control lever having a control end, and a third cable connected to the control end of said second control lever and extending parallel to said first cable to a third hydraulic control valve operator.

* * * * *